(12) United States Patent
Fan (10) Patent No.: US 12,023,585 B2
(45) Date of Patent: Jul. 2, 2024

(54) POSTURE ADJUSTMENT METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Yourui Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 980 days.

(21) Appl. No.: 16/995,510

(22) Filed: Aug. 17, 2020

(65) Prior Publication Data

US 2020/0376381 A1 Dec. 3, 2020

Related U.S. Application Data

(63) Continuation of application No. PCT/CN2019/091188, filed on Jun. 14, 2019.

(30) Foreign Application Priority Data

Jul. 5, 2018 (CN) .......................... 201810730911.8

(51) Int. Cl.
*A63F 13/55* (2014.01)
*A63F 13/42* (2014.01)
(Continued)

(52) U.S. Cl.
CPC .............. *A63F 13/55* (2014.09); *A63F 13/42* (2014.09); *A63F 13/837* (2014.09); *G06T 13/40* (2013.01);
(Continued)

(58) Field of Classification Search
CPC ........ A63F 13/55; A63F 13/42; A63F 13/836; A63F 2300/6045; A63F 2300/6607; A63F 2300/8076; G06T 13/40; G06T 13/80
See application file for complete search history.

(56) References Cited

U.S. PATENT DOCUMENTS 7,645,192 B2   1/2010   Nakazawa et al.
9,400,559 B2   7/2016   Latta et al.
(Continued)

FOREIGN PATENT DOCUMENTS

CN   1321526 A   11/2001
CN   1681566 A   10/2005
(Continued)

OTHER PUBLICATIONS

The World Intellectual Property Organization (WIPO) International Search Report for PCT/CN2019/091188 dated Sep. 11, 2019 10 Pages (including translation).
(Continued)

*Primary Examiner* — Thomas H Henry
(74) *Attorney, Agent, or Firm* — ANOVA LAW GROUP, PLLC (57) ABSTRACT

A posture adjustment method includes: obtaining a first operation through a client, determining a second action in response to the first operation, and playing a target picture in the client. The first operation is used for indicating that a first object performs a first action, the first object is an object in a virtual scene displayed by the client, and a first part of the first object holds a target item being used for launching an attack in the virtual scene. The second action is used for driving, by a second part of the first object, the first part to adjust a holding posture to the target item to automatically achieve a relatively proper and accurate posture of using the target item. The target picture being used for displaying that
(Continued)

the first object performs the first action and the second part of the first object performs the second action.

19 Claims, 6 Drawing Sheets

(51) Int. Cl.
 *A63F 13/837*  (2014.01)
 *G06T 13/40*  (2011.01)
 *G06T 13/80*  (2011.01)
(52) U.S. Cl.
 CPC ...... *G06T 13/80* (2013.01); *A63F 2300/6045* (2013.01); *A63F 2300/6607* (2013.01); *A63F 2300/8076* (2013.01)

(56) References Cited

U.S. PATENT DOCUMENTS

| | | | |
|---|---|---|---|
| 10,857,462 | B2 | 12/2020 | Wei |
| 2001/0039207 | A1 | 11/2001 | Horigami et al. |
| 2006/0073898 | A1* | 4/2006 | Nakazawa ............... A63F 13/45 463/43 |
| 2009/0267942 | A1 | 10/2009 | Endo et al. |
| 2010/0164960 | A1 | 7/2010 | Asami |
| 2010/0173707 | A1 | 7/2010 | Konda et al. |
| 2014/0198954 | A1 | 7/2014 | Bulzacki |

FOREIGN PATENT DOCUMENTS

| | | |
|---|---|---|
| CN | 101501733 A | 8/2009 |
| CN | 101578635 A | 11/2009 |
| CN | 101622647 A | 1/2010 |
| CN | 102449576 A | 5/2012 |
| CN | 103827891 A | 5/2014 |
| CN | 105688409 A | 6/2016 |
| CN | 107773987 A | 3/2018 |
| CN | 107930106 A | 4/2018 |
| CN | 108196669 A | 6/2018 |
| CN | 108970112 A | 12/2018 |
| JP | 4976473 B2 | 7/2012 |
| JP | 2015160114 A | 9/2015 |
| KR | 20150054342 A | 5/2015 |
| WO | 2009007512 A1 | 1/2009 |

OTHER PUBLICATIONS

The State Intellectual Property Office of the People's Republic of China (SIPO) Office Action 1 for for 201810730911.8 dated Jul. 29, 2021 14 Pages (including translation).

Juice Game, "Fierce battlefield: Encounter by a stone! You lie over there, I squat over here!" Baidu.com, May 26, 2018, Retrieved from the Internet: URL: https://haokan.baidu.com/v?pd=wisenatural&vid=16057582386562162858, retrieved on Dec. 22, 2021. 1 page.

* cited by examiner

POSTURE ADJUSTMENT METHOD AND APPARATUS, STORAGE MEDIUM, AND ELECTRONIC DEVICE

RELATED APPLICATIONS

This application is a continuation application of PCT Patent Application No. PCT/CN2019/091188, filed on Jun. 14, 2019, which claims priority to Chinese Patent Application No. 201810730911.8, filed with the National Intellectual Property Administration, PRC on Jul. 5, 2018, and entitled "POSTURE ADJUSTMENT METHOD AND APPARATUS, STORAGE MEDIUM, AND ELECTRONIC DEVICE", content of all of which is incorporated by reference in its entirety.

FIELD OF THE TECHNOLOGY

This application relates to the field of the Internet technology and, specifically, to a posture adjustment method and apparatus, a storage medium, and an electronic device.

BACKGROUND

With the development of multimedia technologies and the popularity of the wireless network, entertainment activities of people become increasingly rich, such as playing a game online by using a portable media device and playing a single-player or online game by using a computer. There are various types of games, such as a barrage shooting game, an adventure game, a simulation game, a role-playing game, casual chess and card games and other games.

In most types of games, a player can choose to play with other players. For example, when playing in a tactical competitive game, a player may need to avoid an enemy's attack and fight back at the same time. When avoiding the enemy's attack, the player needs to control a direction button and an escape action (such as running or creeping) button at the same time, and a shooting button is needed to be operated when fighting back. Because the frequency of controlling buttons such as a running button, a shooting posture adjustment button and a shooting button is too high, a control bottleneck may appear. The player cannot perform the foregoing operations in time (which may cause being hit by the enemy, mistakenly hitting teammates, or the like), thereby reducing user experience.

The disclosed methods and systems are directed to solve one or more problems set forth above and other problems.

SUMMARY

Embodiments of the present disclosure provide a posture adjustment method and apparatus, a storage medium, and an electronic device, to resolve at least the technical problem of relatively complex user interaction in related applications.

According to an aspect of the present disclosure, a posture adjustment method is provided for a terminal. The method includes obtaining a first operation through a client on the terminal, the first operation being used for indicating that a first object performs a first action, the first object being an object in a virtual scene displayed by the client, and a first part of the first object holding a target item being used for launching an attack in the virtual scene. The method also includes determining a second action in response to the first operation, the second action being used for driving, by a second part of the first object, the first part to adjust a holding posture to the target item to automatically achieve a relatively proper and accurate posture of using the target item; and playing a target picture in the client, the target picture being used for displaying that the first object performs the first action and the second part of the first object performs the second action.

According to another aspect of the present disclosure, an electronic device is further provided. The electronic device includes a memory storing computer program instructions, and a processor coupled to the memory. When executing the computer program instructions, the processor is configured to perform: obtaining a first operation through a client on a terminal, the first operation being used for indicating that a first object performs a first action, the first object being an object in a virtual scene displayed by the client, and a first part of the first object holding a target item being used for launching an attack in the virtual scene; determining a second action in response to the first operation, the second action being used for driving, by a second part of the first object, the first part to adjust a holding posture to the target item to automatically achieve a relatively proper and accurate posture of using the target item; and playing a target picture in the client, the target picture being used for displaying that the first object performs the first action and the second part of the first object performs the second action.

According to another aspect of the present disclosure, a non-transitory computer-readable storage medium is further provided. The non-transitory computer-readable storage medium stores computer program instructions executable by at least one processor to perform: obtaining a first operation through a client on a terminal, the first operation being used for indicating that a first object performs a first action, the first object being an object in a virtual scene displayed by the client, and a first part of the first object holding a target item being used for launching an attack in the virtual scene; determining a second action in response to the first operation, the second action being used for driving, by a second part of the first object, the first part to adjust a holding posture to the target item to automatically achieve a relatively proper and accurate posture of using the target item; and playing a target picture in the client, the target picture being used for displaying that the first object performs the first action and the second part of the first object performs the second action.

Other aspects of the present disclosure can be understood by those skilled in the art in light of the description, the claims, and the drawings of the present disclosure.

BRIEF DESCRIPTION OF THE DRAWINGS

The accompanying drawings described herein are used for providing a further understanding of the present disclosure, and form a part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

To make a person skilled in the art better understand solutions of the present disclosure, the following describes the technical solutions in the embodiments of the present disclosure with reference to the accompanying drawings in the embodiments of the present disclosure. Apparently, the described embodiments are merely some rather than all of the embodiments of the present disclosure. Other embodiments obtained by a person of ordinary skill in the art based on the disclosed embodiments of the present disclosure without creative efforts shall fall within the protection scope of the present disclosure.

In the specification, claims, and accompanying drawings of the present disclosure, the terms "first", "second", and so on are intended to distinguish between similar objects rather than describe a specific order or sequence. It is to be understood that the data termed in this way are interchangeable in a proper case, so that the embodiments of the present disclosure described herein can be implemented in other orders than the orders illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

First, some nouns or terms that appear during descriptions of the embodiments of the present disclosure are applicable to the following explanations:

A first-person shooting (FPS) game is a shooting game performed from a player's subjective perspective, belonging to a branch of action games (ACT).

A third-person shooting (TPS) game is a shooting game performed from a third party's perspective. The difference between the TPS and the FPS is that a screen of the FPS only displays a visual field of a protagonist, while TPS more emphasizes a sense of action, and the protagonist is visible on the game screen.

A tactical competitive game refers to a game that seeks victory through confrontation using tactical elements.

According to an aspect of the embodiments of the present disclosure, a posture adjustment method is provided.

Figure 1:
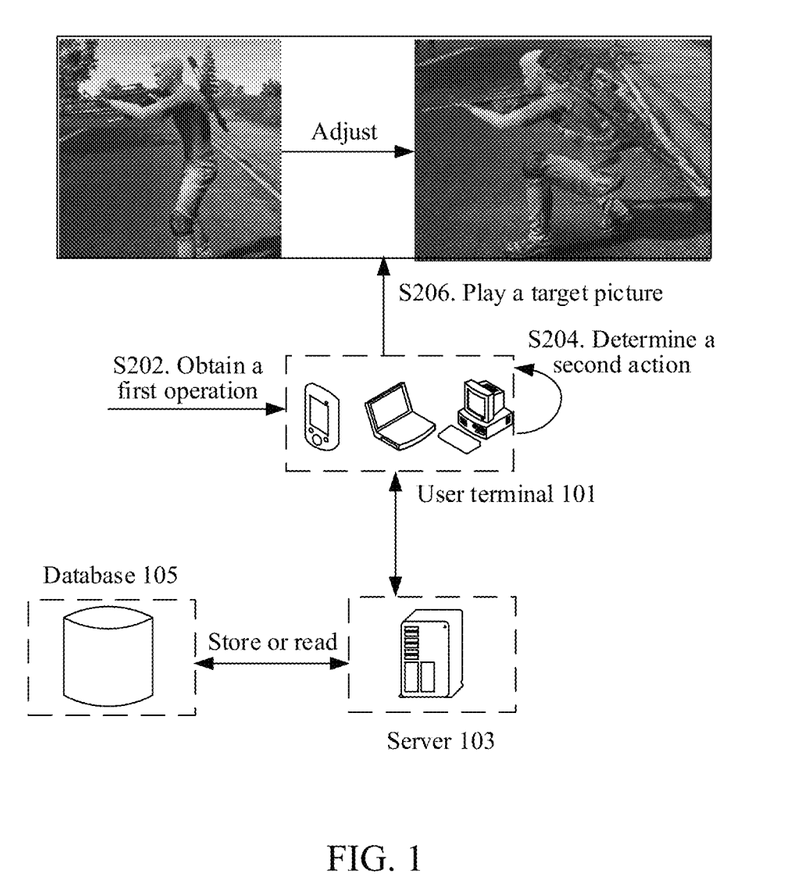
FIG. 1 is a schematic diagram of a hardware environment of a posture adjustment method according to an embodiment of the present disclosure.

In one embodiment, the posture adjustment method may be applied to a hardware environment including a terminal 101 shown in FIG. 1. As shown in FIG. 1, the hardware environment may further include a server 103. The server 103, connected to the terminal 101 through a network (not shown), can be used for providing a service (such as a game service or an application service) for the terminal or a client installed on the terminal. A database 105 can be set on the server 103 or independently of the server 103, and is used for providing a data storage service for the server 103. The network includes a wide area network, a metropolitan area network, or a local area network, and the terminal 101 is not limited to a personal computer (PC), a mobile phone, a tablet computer, or the like.

The posture adjustment method in one embodiment of the present disclosure may be performed by the terminal 101, or may be performed by the server 103, or may be performed jointly by the server 103 and the terminal 101. The posture adjustment method in one embodiment of the present disclosure to be performed by the terminal 101 may alternatively be performed by the client installed on the terminal.

Figure 2:
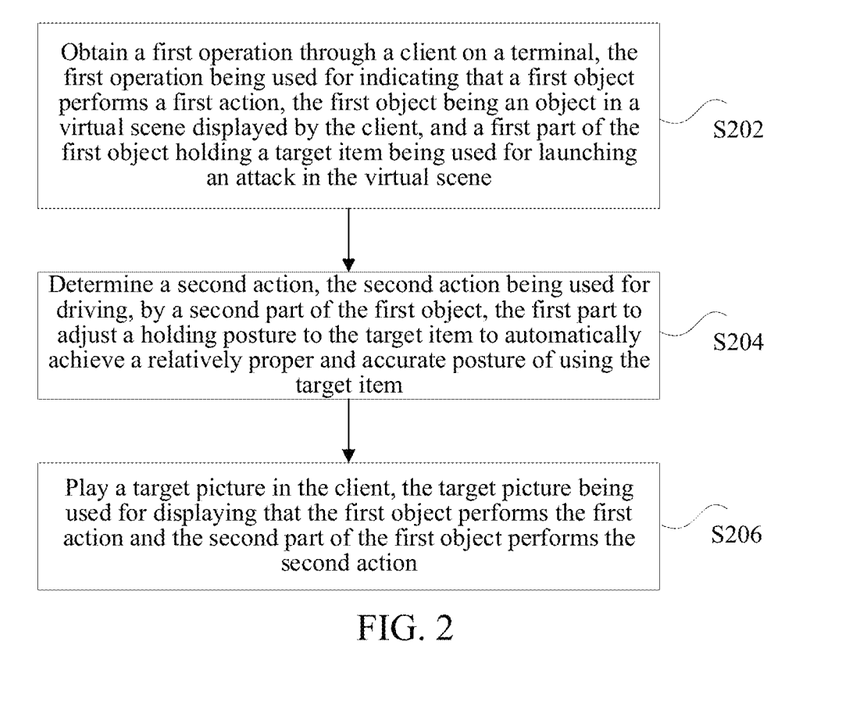
FIG. 2 is a flowchart of a posture adjustment method according to an embodiment of the present disclosure.

FIG. 2 is a flowchart of a posture adjustment method according to an embodiment of the present disclosure. As shown in FIG. 2, the method may include the followings.

S202. A terminal obtains a first operation through a client, the first operation being used for indicating that a first object performs a first action, the first object being an object in a virtual scene displayed by the client, and a first part of the first object holding a target item being used for launching an attack in the virtual scene.

The virtual scene is a scene of an application that allows an attack operation to be performed, such as a scene of a game application, a military simulation application, or a social application. For illustrative purposes, the following uses the game application as an example for description. A game type of the game application includes a barrage game, a shooting game (such as an FPS game or a TPS game), an adventure game, a casual game, and a multiplayer online battle arena game. The client is a client formed after the application is installed on a terminal such as a mobile terminal or a PC.

The first operation is an operation performed on the client, such as a game operation, and is used for triggering the first object in a game to perform the first action. The first action can be a whole-body action of the first object, such as squatting, standing, going prone, moving, turning around, or creeping forward, or can be a local action, such as an action of the first part or turning of an upper body.

The target item can be an item used for launching an attack, such as a pistol, a sniper rifle, an item, a grenade, or a flat pan.

S204. The terminal determines a second action in response to the first operation, the second action being used for driving, by a second part of the first object, the first part to adjust a holding posture to the target item, to automatically achieve a relatively proper and accurate posture of using the target item.

The first action may change the holding posture of the first part of the first object to the target item. Since the holding posture before a change is an adjusted posture of the first object (namely, a relatively proper and accurate posture of using the target item), use of the target item may be affected if the holding posture is changed. Therefore, it is necessary to determine the second action to adjust the holding posture to the target item.

In the embodiment, in a case that a user only triggers the first action, the terminal triggers the second action according to the first action triggered (the second action is triggered by the terminal itself instead of being triggered according to the first operation of the user), so that the holding posture to the target item is adjusted, thereby making the first object always maintain a proper and accurate posture of using the target item.

S206. The terminal plays a target picture in the client, the target picture being used for displaying that the first object performs the first action and the second part of the first object performs the second action.

The target picture can be an animation frame, such as a static animation frame being used for simultaneously indicating an execution result of the first action and an execution result of the second action; and the target picture can alternatively be an animation including a plurality of animation frames. The plurality of animation frames can separately be animation frames used for indicating the execution result of the first action and animation frames used for indicating the execution result of the second action, and the plurality of animation frames can alternatively be animation frames used for indicating an execution process of the first action and animation frames used for indicating an execution process of the second action, or a combination of the two, namely, animation frames used for indicating execution processes and execution results of the first action and the second action. For ease of description, the following description is to be made with reference to an example that the target picture is the plurality of animation frames.

In the embodiment, the description is made with reference to an example that the posture adjustment method in the embodiments of the present disclosure is performed by a terminal 101. In this case, an application service carried by the client can run independently without depending on other services, such as a single-player game; and the posture adjustment method in the embodiments of the present disclosure may alternatively be jointly performed by a server 103 and a terminal 101. For example, the terminal detects the first operation of a user, then the server determines a corresponding second action, and then the terminal plays the target picture. In this case, an application service carried by the client can run depending on other services, such as an online game. The posture adjustment method in one embodiment of the present disclosure to be performed by the terminal 101 may alternatively be performed by the client installed on the terminal.

In the technical solutions of the present disclosure, in a case that the first operation only triggers the first action, the second action can be determined according to the first action triggered, and the holding posture to the target item can be adjusted through the second action, so that the first object always maintains a relatively comfortable, proper and accurate posture of using the target item, and a user does not need to personally adjust the holding posture to the target item, which can resolve the technical problem of the relatively complex user interaction in the related applications, thereby achieving the technical effect of reducing interaction complexity of using the target item.

The technical solutions of the present disclosure are to be further described in detail with reference to an example that the technical solutions of the present disclosure are applied to a game application. In this case, the client can be a client of a third-person shooting game in shooting games, and the target item can be a sniper rifle. As shown in FIG. 2: in the technical solution provided in S202, the terminal obtains the first operation through the client, the first operation being used for indicating that the first object performs the first action, the first object being the object in the virtual scene displayed by the client, and the first part of the first object holding the target item being used for launching the attack in the virtual scene.

Figure 3:
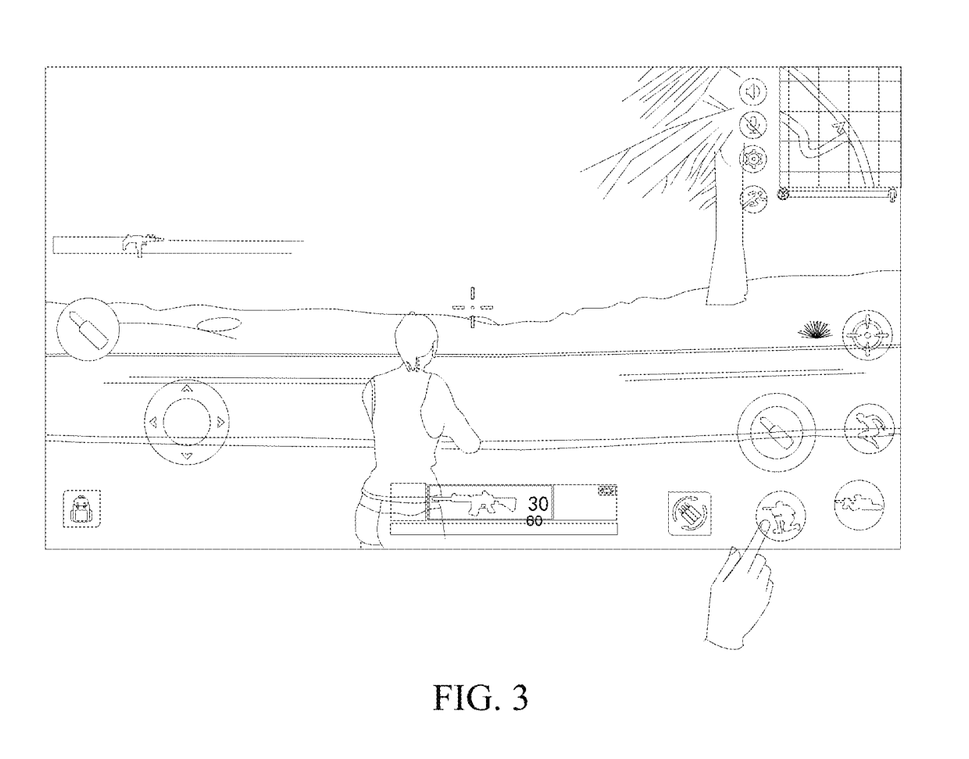
FIG. 3 is a schematic diagram of a posture adjustment interface according to an embodiment of the present disclosure.

In an embodiment, as shown in FIG. 3, a player can click an operation button in the client such as "squatting", "going prone" or "jumping", a "click" operation of the player being the first operation; and an action triggered by the click operation such as "squatting", "going prone" or "jumping" is the first action.

In the technical solution provided in S204, the terminal determines the second action in response to the first operation, the second action being used for driving, by the second part of the first object, the first part to adjust the holding posture to the target item.

In one embodiment, the determining the second action includes the following steps 1 to 3:

Step 1. Obtain a target state of the first object after the first object performs the first action.

The target state is a state in a case that the first object is relatively stable after performing the first action, such as a standing state, a creeping state or a half-squatting state.

Step 2. Search for a first posture corresponding to the target state, the first posture being used for indicating the holding posture of the first part of the first object to the target item.

Optionally, the searching for a first posture corresponding to the target state includes the following implementations:

One implementation is searching for a corresponding posture only according to a state, and searching for the first posture matching the target state from a first posture set, each posture in the first posture set corresponding to a state of the first object, that is, there is a one-to-one correspondence between postures and states.

The other implementation is searching for a corresponding posture according to a state and an item type. For example, with an item as a unit, postures corresponding to the same item are stored in the same set and postures corresponding to a plurality of items are stored through a plurality of sets. In this case, a second posture set matching an item type of the target item in the plurality of sets can be searched for first, and then the first posture matching the target state is searched for from the second posture set, each of the plurality of sets corresponding to a type of items, and each posture in the second posture set corresponding to a state of the first object; or with a state as a unit, postures corresponding to the same state are stored in the same set and postures corresponding to a plurality of states are stored through a plurality of sets. In this case, a second posture set matching the target state in the plurality of sets can be searched for first, and then the first posture matching an item type of the target item is searched for from the second posture set.

Step 3. Determining, according to the first posture, the second action to be performed by the second part of the first object.

Optionally, the determining, according to the first posture, the second action to be performed by the second part of the first object includes following steps 31 to 33:

Step 31. Obtain a first position A and a second position D, the first position being a position of a first end (an end connected to a trunk) of the second part (such as an upper arm of an upper limb) after the first object performs the first action, a second end of the second part being connected to a first end of the first part at a point B, and the second position D being a position of a second end of the first part (such as a forearm of the upper limb) after the first object performs the first action.

Figure 4:
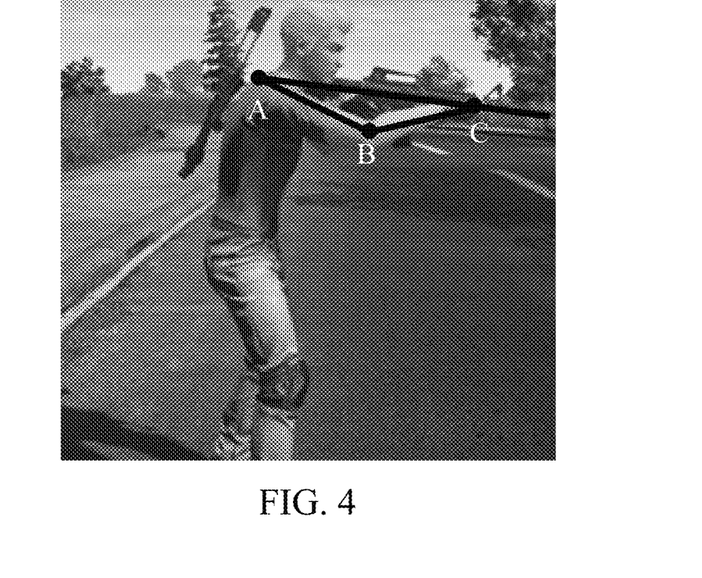
FIG. 4 is a schematic diagram of a posture adjustment interface according to an embodiment of the present disclosure.
Figure 5:
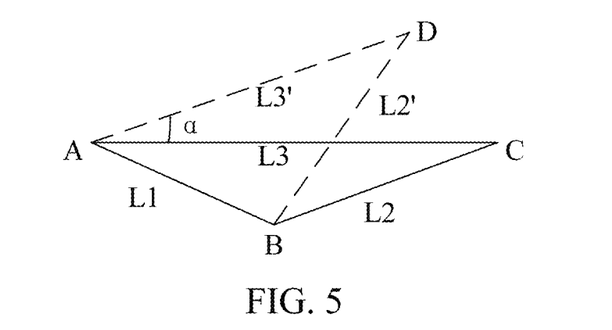
FIG. 5 is a schematic diagram of a bone structure according to an embodiment of the present disclosure.

In an embodiment, a gun holding posture (that is, a holding posture to a gun as the target item) of the first object in the target state is to be as shown in FIG. 4. FIG. 5 is obtained by abstracting the first part, the second part and a gun, L1 indicating an upper arm (or referred to as a parent skeleton), L2 indicating a forearm (or referred to as a child skeleton), and L3 indicating a gun (or referred to as a solving line).

Step 32. The gun holding posture of the first object after performing the first action is shown in FIG. 5, L2' indicating a forearm, and L3' indicating a gun, which is obviously different from the gun holding posture that the first object is to have (as shown in FIG. 4). In this case, a target angle α can be obtained for ease of adjustment, the target angle being an angle between a first line L3 and a second line L3' in a first direction (such as a counter-clockwise direction) of the first position A, the second line L3' being a line passing through the first position A and the second position D, the first line being a line passing through the first position A and a third position C, and the third position being a position of the second end of the first part in a case that the holding posture of the first part to the target item is the first posture and the first end of the second part is in the first position.

Figure 6:
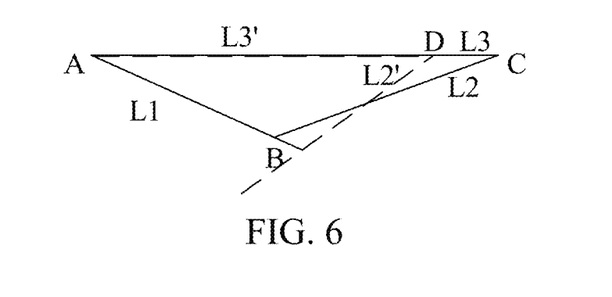
FIG. 6 is a schematic diagram of another bone structure according to an embodiment of the present disclosure.

Step 33. Determining an action that the second line L3' rotates through the target angle in a second direction (such as a clockwise direction) at the first position A as the second action, a result of rotation being as shown in FIG. 6, and the second line L3' and the first line L3 coinciding with each other after the rotation.

Further, for each state of the first object, there is a corresponding optimal holding posture, such as a gun holding posture, which can be understood as a hand feeling. In a related shooting game, a player cannot maintain the hand feeling. The player always needs to manually adjust a shooting posture, which is time-consuming and laborious with poor user experience. However, in the technical solutions of the present disclosure, the holding posture corresponding to the state of the first object is formed according to an underlying logic configuration of the game or a user habit.

In a case that the holding posture corresponding to the state of the first object is configured according to underlying logic of the game, holding postures corresponding to various states can be defined in advance in game development, such as shooting postures in cases of standing, going prone, and half-squatting, and the holding postures are stored in the underlying logic configuration of the game. In a process that a player plays the game, if a corresponding operation (such as the first operation described above) is detected, the underlying logic configuration of the game is to be automatically triggered or triggered according to a certain proportion, to adjust the feel of hand postures.

In a case that the holding posture corresponding to the state of the first object is configured according to the user habit, the following solution can be used for implementation. Using the first posture corresponding to the target state as an example, before obtaining the first operation through the client, a second operation is obtained through the client in a case that the first object is in the target state, the second operation being used for indicating, by the player, that the holding posture of the first part of the first object to the target item is adjusted from a second posture to the first posture. That is, the player performs a self-adjustment; and a correspondence between the first posture and the target state is stored in a case of detecting a plurality of times (for example, N times) that a user performs the adjustment. In this way, in a case that the user is in the target state again when the user plays the game later, the adjustment is performed automatically without needing a manual adjustment of the player, which means that the player develops muscle memory and has a shooting handy feeling, thereby improving the user experience.

In one embodiment, the adjustments performed each time by the player in various states can be monitored and recorded, and be taken as the hand feeling of the player. In a case that the player enters the state next time, the adjustment is performed automatically, thereby improving the hand feeling of the player.

In the technical solution provided in S206, the terminal plays a target picture in the client, the target picture being used for displaying that the first object performs the first action and the second part of the first object performs the second action.

In the embodiments, the playing a target picture in the client includes, but is not limited to the following play modes:

One play mode is playing a plurality of first animation frames and a plurality of second animation frames in the client, the target picture including the plurality of first animation frames and the plurality of second animation frames, the plurality of first animation frames being used for indicating that the first object performs the first action, and the plurality of second animation frames being used for indicating that the second part of the first object performs the second action.

In one embodiment, the first action and the second action can be performed separately. A sequence of performing the first action and the second action is not limited in the present disclosure, and any one action can be first performed and then the other is performed. That is, in a case that the plurality of first animation frames and the plurality of second animation frames are played in the client, the plurality of first animation frames can be played in the client, and then the plurality of second animation frames are played in a case that the playing of the plurality of first animation frames is finished, that is, the first action is performed first, and then the second action is performed; or the plurality of second animation frames can be played in the client, and then the plurality of first animation frames are played in a case that the playing of the plurality of second animation frames is finished, that is, the second action is performed first, and then the first action is performed.

Another play mode is playing a plurality of third animation frames in the client, the target picture including the plurality of third animation frames, and the plurality of third animation frames being used for indicating that the first action and the second action are synchronously performed, that is, the first action and the second action may be performed at the same time.

In one embodiment, after the target picture is played in the client, in a case that a third operation is obtained through the client, the first object can be controlled according to an indication of the third operation, to use the target item to shoot at a second object in the virtual scene, the third operation being an operation triggered by a user logging in to the client, and the client being a client of a third-person shooting game application.

In one embodiment of the present disclosure, a technical solution for controlling gun holding through Inverse Kinematics (IK) is implemented. By using an IK principle, IK performs drive from bottom to top. After setting a position of a hand, the hand keeps still when a role gets up, and bones of a forearm and an upper arm automatically rotate to an appropriate angle, making the to gun holding posture more natural.

In solutions that need to be close to gun parameters in a real environment, it may be impossible to adjust relevant parameters of the gun according to the game situation. In the present disclosure, a simulated adjustment is performed according to a real hand-feel of the player so that a gun holding action of the gun is close to reality and convenient for adjustment. In one embodiment, the following further describes the technical solutions of the present disclosure in detail with reference to an example that the method of one embodiment of the present disclosure is applied to a third-person shooting game.

Figure 7:
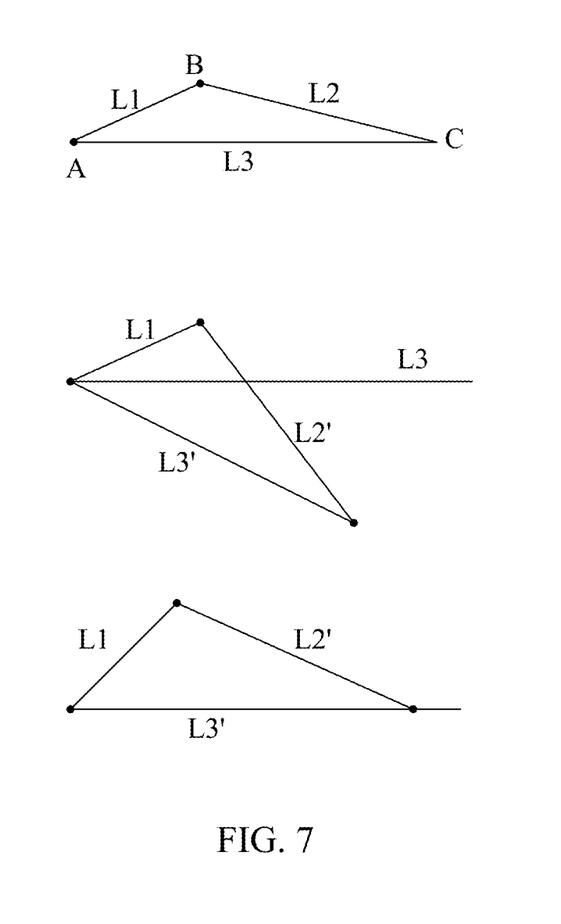
FIG. 7 is a schematic diagram of another bone structure according to an embodiment of the present disclosure.

A line segment of L1 in FIG. 7 is a parent bone (or referred to as a parent skeleton, namely, the second part, a first end on the left side and a second end on the right side). A line segment of L2 is a child bone (or referred to as a child skeleton, namely, the first part, a first end on the left side and a second end on the right side). A line segment of L3 is an IK solving line, and a right end of the IK solving line, when approaching a left end, drives a skeleton to do a bending movement. The method includes the following steps.

1) Make and then record the IK solving line, that is, the line segment L3.

2) Make the child bone perform a rotation movement in a clockwise direction, and then make an IK solving line again, that is, a line segment L3'. In this case, an angle between the line segment L3 and the line segment L3' can be calculated.

Figure 8:
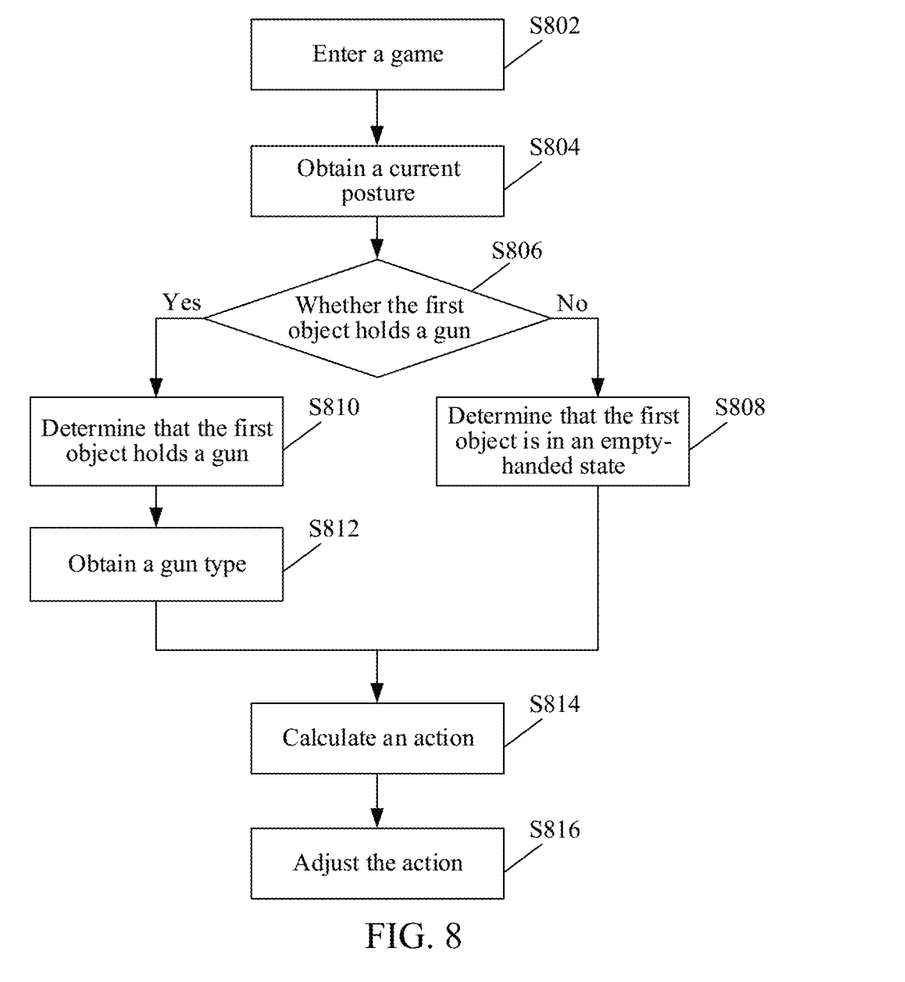
FIG. 8 is a flowchart of a posture adjustment method according to an embodiment of the present disclosure.

3) Make the parent bone rotate reversely through a corresponding angle. The parent bone drives the child bone so that the line segment L3' and the line segment L3 coincide with each other. A gun holding action is simulated in this way, and the gun holding action can be made more natural by adjusting rotation degrees at any time. Specifically, as shown in FIG. 8:

S802. Enter a game.

S804. Obtain a current posture (or a posture in a target state) of a role (a first object).

S806. Determine whether the first object currently holds a gun, perform S810 in a case that the first object holds a gun, and perform S808 in a case that the first object does not hold a gun.

S808. Determine that the first object is in an empty-handed state and perform S814.

S810. Determine that the first object holds a gun.

S812. Obtain a gun type (namely, an item type).

S814. Calculate an action by using an IK algorithm.

S816. Adjust the action.

For the gun holding posture, several states of standing, squatting, and laying down are mainly recorded, each state corresponding to each of different postures. The client and the server determine the player's current posture at the same time, and then calculate a last gun holding posture according to the posture of the player and an IK formula. The gun holding posture is related to the posture of the player and a hand-held gun. Actions of a pistol, a submachine gun, an automatic rifle, a sniper rifle and a missile (a grenade or a smoke grenade) match different IK formulas according to character postures, and different actions are displayed to the player through the client.

Figure 9:
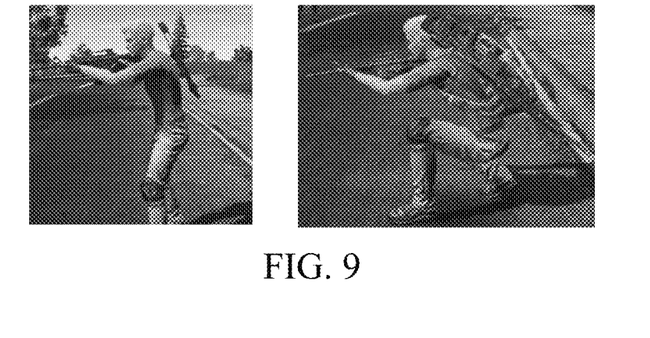
FIG. 9 is a schematic diagram of a posture adjustment interface according to an embodiment of the present disclosure.

As shown in FIG. 9, through the action calculated by using the IK, an accurate gun holding posture can be maintained when standing, squatting, or laying down, and the player can have better shooting game experience after using this solution.

For ease of description, the disclosed methods are stated as a series of action combinations. However, a person skilled in the art needs to learn that the present disclosure is not limited to the described sequence of the actions because according to the present disclosure, some steps may use another sequence or may be simultaneously performed. In addition, it is to be understood by a person skilled in the art that the embodiments described in this specification are all preferred embodiments, and the actions and modules in the embodiments are not necessary for the present disclosure.

Further, a person skilled in the art may clearly understand that the disclosed methods may be implemented by means of software and a necessary general hardware platform, and certainly, may also be implemented by hardware, but in many cases, the former manner is a better implementation. Based on such an understanding, the technical solutions of the present disclosure essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, a network device, or the like) to perform the methods according to the embodiments of the present disclosure.

Figure 10:
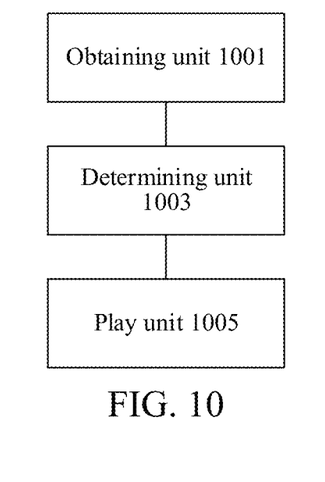
FIG. 10 is a schematic diagram of a posture adjustment apparatus according to an embodiment of the present disclosure.

According to another aspect of the embodiments of the present disclosure, a posture adjustment apparatus for implementing the posture adjustment method is further provided. FIG. 10 is a schematic diagram of a posture adjustment apparatus according to an embodiment of the present disclosure. As shown in FIG. 10, the apparatus may include: an obtaining unit 1001, a determining unit 1003, and a play unit 1005.

The obtaining unit 1001 is configured to obtain a first operation through a client, the first operation being used for indicating that a first object performs a first action, the first object being an object in a virtual scene displayed by the client, and a first part of the first object holding a target item being used for launching an attack in the virtual scene.

The determining unit 1003 is configured to determine a second action in response to the first operation, the second action being used for driving, by a second part of the first object, the first part to adjust a holding posture to the target item.

The play unit 1005 is configured to play a target picture in the client, the target picture being used for displaying that the first object performs the first action and the second part of the first object performs the second action.

The obtaining unit 1001 may be configured to perform S202 in the embodiments of the present disclosure, the determining unit 1003 may be configured to perform S204 in the embodiments of the present disclosure, and the play unit 1005 may be configured to perform S206 in the embodiments of the present disclosure.

Implemented examples and application scenarios of the modules are the same as those of the corresponding steps, but are not limited to the content disclosed in the embodiments. The modules may be run in the hardware environment shown in FIG. 1 as a part of the apparatus, and may be implemented by software, or may be implemented by hardware.

Further, the play unit may include: a first play module, configured to play at least one first animation frame and at least one second animation frame in the client, the target picture including the at least one first animation frame and the at least one second animation frame, the at least one first animation frame being used for indicating that the first object performs the first action, and the at least one second animation frame being used for indicating that the second part of the first object performs the second action; and a second play module, configured to play at least one third animation frame in the client, the target picture including the at least one third animation frame, and the at least one third animation frame being used for indicating that the first action and the second action are synchronously performed.

Optionally, the first play module may include: a first play submodule, configured to play the at least one first animation frame in the client, and then play the at least one second animation frame in a case that the playing of the at least one first animation frame is finished; and a second play submodule, configured to play the at least one second animation frame in the client, and then play the at least one first animation frame in a case that the playing of the at least one second animation frame is finished.

Optionally, the determining unit may include: an obtaining module, configured to obtain a target state of the first object after the first object performs the first action after the first operation is obtained through the client; a search module, configured to search for a first posture to corresponding to the target state, the first posture being used for indicating the holding posture of the first part of the first object to the target item; and a determining module, configured to determine, according to the first posture, the second action to be performed by the second part of the first object.

The determining module may include: a first obtaining submodule, configured to obtain a first position and a second position, the first position being a position of a first end of the second part after the first object performs the first action, a second end of the second part being connected to a first end of the first part, and the second position being a position of a second end of the first part after the first object performs the first action; a second obtaining submodule, configured to obtain a target angle, the target angle being an angle between a first line and a second line in a first direction of the first position, the second line being a line passing through the first position and the second position, the first line being a line passing through the first position and a third position, and the third position being a position of the second end of the first part in a case that the holding posture of the first part to the target item is the first posture and the first end of the second part is in the first position; and a determining submodule, configured to determine an action that the second line rotates through the target angle in a second direction at the first position as the second action, the second direction being opposite to the first direction.

The search module may be further configured to: search for the first posture matching the target state from a first posture set, each posture in the first posture set corresponding to a state of the first object; or search for a second posture set matching an item type of the target item in the plurality of sets, and search for the first posture matching the target state from the second posture set, each of the plurality of sets corresponding to a type of items, and each posture in the second posture set corresponding to a state of the first object.

Optionally, the apparatus according to the present disclosure may further include a configuration unit, configured to obtain, before obtaining the first operation through the client, a second operation through the client in a case that the first object is in the target state, the second operation being used for indicating that the holding posture of the first part of the first object to the target item is adjusted from a second posture to a first posture; and store a correspondence between the first posture and the target state.

Optionally, the apparatus according to the present disclosure may further include: a control unit, configured to control, according to an indication of a third operation, after the target picture is played in the client, the first object to use the target item to shoot at a second object in the virtual scene in a case that the third operation is obtained through the client, the third operation being an operation triggered by a user logging in to the client, and the client being a client of a third-person shooting game application.

According to another aspect of the embodiments of the present disclosure, a server or a terminal for implementing the posture adjustment method is further provided.

Figure 11:
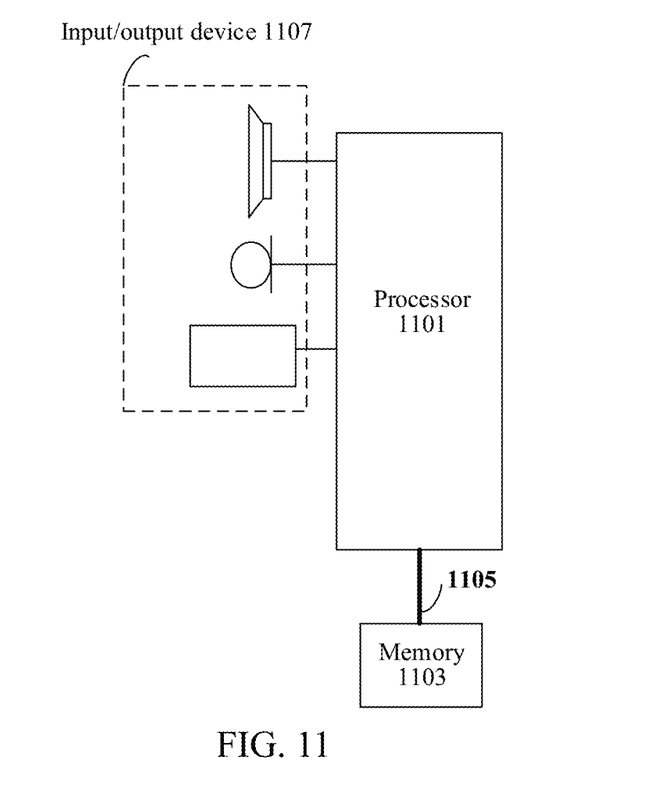
FIG. 11 is a structural block diagram of a terminal according to an embodiment of the present disclosure.

FIG. 11 is a structural block diagram of a terminal according to an embodiment of the present disclosure. As shown in FIG. 11, the terminal may include: one or more processors 1101 (only one is shown in FIG. 11), a memory 1103, and a transmission apparatus 1105 (such as the sending apparatus in the embodiments). As shown in FIG. 11, the terminal may further include an input/output device 1107.

The memory 1103 may be configured to store a software program and a module, for example, a program instruction/module corresponding to the posture adjustment method and apparatus in the embodiments of the present disclosure, and the processor 1101 performs various functional applications and data processing by running the software program and the module stored in the memory 1103, that is, implementing the posture adjustment method. The memory 1103 may include a high-speed random memory, and may also include a nonvolatile memory such as one or more magnetic storage devices, a flash memory, or another nonvolatile solid-state memory. In some embodiments, the memory 1103 may further include memories remotely disposed relative to the processor 1101, and the remote memories may be connected to a terminal by using a network. An example of the network includes the Internet, an intranet, a local area network, a mobile communications network, or a combination thereof.

The transmission apparatus 1105 is configured to receive or send data by means of a network, or may further be configured to transmit data between the processor and the memory. A specific example of the network may include a wired network and a wireless network. In an example, the transmission apparatus 1105 includes a network interface controller (NIC), and the network interface card may be connected to another network device and a router via a network cable to communicate with the Internet or a local area network. In an example, the transmission apparatus 1105 is a radio frequency (RF) module, configured to communicate with the Internet in a wireless manner.

Specifically, the memory 1103 is configured to store an application. The processor 1101 may invoke, by using the transmission apparatus 1105, the application program stored in the memory 1103, to perform the followings: obtaining a first operation through a client, the first operation being used for indicating that a first object performs a first action, the first object being an object in a virtual scene displayed by the client, and a first part of the first object holding a target item being used for launching an attack in the virtual scene; determining a second action in response to the first operation, the second action being used for driving, by a second part of the first object, the first part to adjust a holding posture to the target item; and playing a target picture in the client, the target picture being used for displaying that the first object performs the first action and the second part of the first object performs the second action.

The processor 1101 is further configured to perform the followings: obtaining a first position and a second position, the first position being a position of a first end of the second part after the first object performs the first action, a second end of the second part being connected to a first end of the first part, and the second position being a position of a second end of the first part after the first object performs the first action; obtaining a target angle, the target angle being an angle between a first line and a second line in a first direction of the first position, the second line being a line passing through the first position and the second position, the first line being a line passing through the first position and a third position, and the third position being a position of the second end of the first part in a case that the holding posture of the first part to the target item is the first posture and the first end of the second part is in the first position; and determining an action that the second line rotates through the target angle in a second direction at the first position as the second action, the second direction being opposite to the first direction.

Optionally, for a specific example in one embodiment, reference may be made to the examples described in the embodiments, and details are not described in one embodiment again.

A person of ordinary skill in the art may understand that the structure shown in FIG. 11 is merely an example, and the terminal may be a terminal device such as a smartphone (for example, an Android mobile phone or an iOS mobile phone), a tablet computer, a palmtop computer, a mobile Internet device (MID), or a PAD. FIG. 11 does not constitute a limitation on the structure of the electronic device. For example, the terminal may further include more or fewer components (for example, a network interface and a display apparatus) than those shown in FIG. 11, or have a configuration different from that shown in FIG. 11.

A person of ordinary skill in the art may understand that all or some of the steps of the disclosed methods may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of the present disclosure further provides a storage medium. Optionally, in one embodiment, the storage medium may be configured to store a computer program for performing the posture adjustment method.

Optionally, in one embodiment, the storage medium may be located on at least one of a plurality of network devices in the network described in the embodiment.

Optionally, in one embodiment, the storage medium is configured to store the computer program for performing the followings:

S12. Obtain a first operation through a client, the first operation being used for indicating that a first object performs a first action, the first object being an object in a virtual scene displayed by the client, and a first part of the first object holding a target item being used for launching an attack in the virtual scene.

S14. Determine a second action in response to the first operation, the second action being used for driving, by a second part of the first object, the first part to adjust a holding posture to the target item.

S16. Play a target picture in the client, the target picture being used for displaying that the first object performs the first action and the second part of the first object performs the second action.

Optionally, the storage medium is further configured to store a computer program used for performing the following steps:

S22. Obtain a first position and a second position, the first position being a position of a first end of the second part after the first object performs the first action, a second end of the second part being connected to a first end of the first part, and the second position being a position of a second end of the first part after the first object performs the first action.

S24. Obtain a target angle, the target angle being an angle between a first line and a second line in a first direction of the first position, the second line being a line passing through the first position and the second position, the first line being a line passing through the first position and a third position, and the third position being a position of the second end of the first part in a case that the holding posture of the first part to the target item is the first posture and the first end of the second part is in the first position.

S26. Determine an action that the second line rotates through the target angle in a second direction at the first position as the second action, the second direction being opposite to the first direction.

Accordingly, in the embodiments of the present disclosure, the first operation is obtained through the client, the first operation being used for indicating that the first object performs the first action, the first object being the object in the virtual scene displayed by the client, and the first part of the first object holding the target item being used for launching the attack in the virtual scene; the second action is determined in response to the first operation, the second action being used for driving, by the second part of the first object, the first part to adjust the holding posture to the target item; and the target picture is played in the client, the target picture being used for displaying that the first object performs the first action and the second part of the first object performs the second action. In other words, according to the technical solutions of the present disclosure, in a case that the first operation only triggers the first action, the second action can be determined according to the first action triggered, and the holding posture to the target item can be adjusted through the second action, so that the first object always maintains a relatively comfortable, proper and accurate posture of using the target item, and a user does not need to personally adjust the holding posture to the target item, which can resolve the technical problem of the relatively complex user interaction in the related applications, thereby achieving the technical effect of reducing interaction complexity of using the target item.

Further, the storage medium may include any medium that can store a computer program, such as a USB flash drive, a read-only memory (ROM), a random access memory (RAM), a removable hard disk, a magnetic disk, or an optical disc.

When the integrated unit in the embodiments is implemented in a form of a software functional unit, the integrated unit may be stored in the computer-readable storage medium. Based on such understanding, the technical solutions of the present disclosure essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the embodiments of the present disclosure, descriptions of the embodiments have different emphases, and as for parts that are not described in detail in one embodiment, reference can be made to the relevant descriptions of the other embodiments.

In the several embodiments provided in the present disclosure, it is to be understood that the disclosed client may be implemented in other manners. The described apparatus embodiment is merely an example. For example, the unit division is merely logical function division and may be another division in an actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software function unit.

The descriptions are merely exemplary implementations of the present disclosure. A person of ordinary skill in the art may make improvements and modifications without departing from the principle of the present disclosure, and all such improvements and modifications fall in the protection scope of the present disclosure.

What is claimed is:

1. A posture adjustment method for a terminal, comprising:
   obtaining a first operation through a client on the terminal, the first operation being used for indicating that a first object performs a first action, the first object being an object in a virtual scene displayed by the client, and a first part of the first object holding a target item being used for launching an attack in the virtual scene;
   determining a second action in response to the first operation, the second action being used for driving, by a second part of the first object, the first part to adjust a holding posture of using the target item by rotating the first part relative to the second part, wherein determining the second action further comprises:
      receiving, in response to the first operation, a first angle based on an inverse kinematics (IK) algorithm;
      rotating, according to the first angle, the first part in a first direction;
      calculating, according to the first angle, a second angle based on the IK algorithm; and
      rotating, according to the second angle, the second part in a second direction reverse to the first direction, wherein the first part is driven to rotate while the second part is rotating; and
   playing a target picture in the client, the target picture being used for displaying that the first object performs the first action and the second part of the first object performs the second action.

2. The method according to claim 1, wherein the playing a target picture in the client comprises:
   playing at least one first animation frame and at least one second animation frame in the client, the target picture comprising the at least one first animation frame and the at least one second animation frame, the at least one first animation frame being used for indicating that the first object performs the first action, and the at least one second animation frame being used for indicating that the second part of the first object performs the second action; or
   playing at least one third animation frame in the client, the target picture comprising the at least one third animation frame, and the at least one third animation frame being used for indicating that the first object synchronously performs the first action and the second action.

3. The method according to claim 2, wherein the playing at least one first animation frame and at least one second animation frame in the client comprises:
   playing the at least one first animation frame in the client, and then playing the at least one second animation frame in a case that the playing of the at least one first animation frame is finished; or
   playing the at least one second animation frame in the client, and then playing the at least one first animation frame in a case that the playing of the at least one second animation frame is finished.

4. The method according to claim 1, wherein the determining a second action comprises:
   obtaining a target state of the first object after the first object performs the first action;
   searching for a first posture corresponding to the target state, the first posture being used for indicating the holding posture of the first part of the first object to the target item; and
   determining, according to the first posture, the second action to be performed by the second part of the first object.

5. The method according to claim 4, wherein the determining, according to the first posture, the second action to be performed by the second part of the first object comprises:
   obtaining a first position and a second position, the first position being a position of a first end of the second part after the first object performs the first action, a second end of the second part being connected to a first end of the first part, and the second position being a position of a second end of the first part after the first object performs the first action;
   obtaining a target angle, the target angle being an angle between a first line and a second line in the first direction of the first position, the second line being a line passing through the first position and the second position, the first line being a line passing through the first position and a third position, and the third position being a position of the second end of the first part in a case that the holding posture of the first part to the target item is the first posture and the first end of the second part is in the first position; and
   determining an action that the second line rotates through the target angle in the second direction at the first position as the second action, the second direction being opposite to the first direction.

6. The method according to claim 4, wherein the searching for a first posture corresponding to the target state comprises:
   searching for the first posture matching the target state from a first posture set, each posture in the first posture set corresponding to a state of the first object; or
   searching for a second posture set matching an item type of the target item in a plurality of sets, and searching for the first posture matching the target state from the second posture set, each of the plurality of sets corresponding to a type of items, and each posture in the second posture set corresponding to a state of the first object.

7. The method according to claim 1, wherein before the obtaining a first operation through a client, the method further comprises:

obtaining a second operation through the client in a case that the first object is in the target state, the second operation being used for indicating that the holding posture of the first part of the first object to the target item is adjusted from a second posture to a first posture; and storing a correspondence between the first posture and the target state.

8. The method according to claim 1, wherein after the playing a target picture in the client, the method further comprises:

controlling, according to an indication of a third operation, the first object to use the target item to shoot at a second object in the virtual scene in a case that the third operation is obtained through the client, the third operation being an operation triggered by a user logging in to the client, and the client being a client of a third-person shooting game application.

9. The method according to claim 1, wherein determining the second action further comprises:

determining a first solving line based on a position of the target item and a position of one end of the first part that is not connected to the second part; and after rotating the first part in the first direction, determining a second solving line based on an updated position of the target item and the end of the first part that is not connected to the second part; and calculating the first angle based on the IK algorithm to make the second solving line coincide with the first solving line as a result of rotating the second part based on the second angle in the second direction.

10. An electronic device, comprising:

a memory storing computer program instructions; and a processor coupled to the memory and, when executing the computer program instructions, configured to perform:

obtaining a first operation through a client on a terminal, the first operation being used for indicating that a first object performs a first action, the first object being an object in a virtual scene displayed by the client, and a first part of the first object holding a target item being used for launching an attack in the virtual scene;

determining a second action in response to the first operation, the second action being used for driving, by a second part of the first object, the first part to adjust a holding posture of using the target item by rotating the first part relative to the second part, wherein determining the second action further comprises:

receiving, in response to the first operation, a first angle based on an inverse kinematics (IK) algorithm;

rotating, according to the first angle, the first part in a first direction;

calculating, according to the first angle, a second angle based on the IK algorithm; and rotating, according to the second angle, the second part in a second direction reverse to the first direction, wherein the first part is driven to rotate while the second part is rotating; and playing a target picture in the client, the target picture being used for displaying that the first object performs the first action and the second part of the first object performs the second action.

11. The electronic device according to claim 10, wherein the playing a target picture in the client comprises:

playing at least one first animation frame and at least one second animation frame in the client, the target picture comprising the at least one first animation frame and the at least one second animation frame, the at least one first animation frame being used for indicating that the first object performs the first action, and the at least one second animation frame being used for indicating that the second part of the first object performs the second action.

12. The electronic device according to claim 11, wherein the playing at least one first animation frame and at least one second animation frame in the client comprises:

playing the at least one first animation frame in the client, and then playing the at least one second animation frame in a case that the playing of the at least one first animation frame is finished; or playing the at least one second animation frame in the client, and then playing the at least one first animation frame in a case that the playing of the at least one second animation frame is finished.

13. The electronic device according to claim 10, wherein the determining a second action comprises:

obtaining a target state of the first object after the first object performs the first action;

searching for a first posture corresponding to the target state, the first posture being used for indicating the holding posture of the first part of the first object to the target item; and determining, according to the first posture, the second action to be performed by the second part of the first object.

14. The electronic device according to claim 13, wherein the determining, according to the first posture, the second action to be performed by the second part of the first object comprises:

obtaining a first position and a second position, the first position being a position of a first end of the second part after the first object performs the first action, a second end of the second part being connected to a first end of the first part, and the second position being a position of a second end of the first part after the first object performs the first action;

obtaining a target angle, the target angle being an angle between a first line and a second line in the first direction of the first position, the second line being a line passing through the first position and the second position, the first line being a line passing through the first position and a third position, and the third position being a position of the second end of the first part in a case that the holding posture of the first part to the target item is the first posture and the first end of the second part is in the first position; and determining an action that the second line rotates through the target angle in the second direction at the first position as the second action, the second direction being opposite to the first direction.

15. The electronic device according to claim 13, wherein the searching for a first posture corresponding to the target state comprises:

searching for the first posture matching the target state from a first posture set, each posture in the first posture set corresponding to a state of the first object; or searching for a second posture set matching an item type of the target item in a plurality of sets, and searching for the first posture matching the target state from the second posture set, each of the plurality of sets corresponding to a type of items, and each posture in the second posture set corresponding to a state of the first object.

16. The electronic device according to claim 10, wherein before the obtaining a first operation through a client, the processor is further configured to perform:
- obtaining a second operation through the client in a case that the first object is in the target state, the second operation being used for indicating that the holding posture of the first part of the first object to the target item is adjusted from a second posture to a first posture; and
- storing a correspondence between the first posture and the target state.

17. The electronic device according to claim 10, wherein after the playing a target picture in the client, the processor is further configured to perform:
- controlling, according to an indication of a third operation, the first object to use the target item to shoot at a second object in the virtual scene in a case that the third operation is obtained through the client, the third operation being an operation triggered by a user logging in to the client, and the client being a client of a third-person shooting game application.

18. A non-transitory computer-readable storage medium storing computer program instructions executable by at least one processor to perform:
- obtaining a first operation through a client on a terminal, the first operation being used for indicating that a first object performs a first action, the first object being an object in a virtual scene displayed by the client, and a first part of the first object holding a target item being used for launching an attack in the virtual scene;
- determining a second action in response to the first operation, the second action being used for driving, by a second part of the first object, the first part to adjust a holding posture of using the target item by rotating the first part relative to the second part, wherein determining the second action further comprises:
  - receiving, in response to the first operation, a first angle based on an inverse kinematics (IK) algorithm;
  - rotating, according to the first angle, the first part in a first direction;
  - calculating, according to the first angle, a second angle based on the IK algorithm; and
- rotating, according to the second angle, the second part in a second direction reverse to the first direction, wherein the first part is driven to rotate while the second part is rotating; and
- playing a target picture in the client, the target picture being used for displaying that the first object performs the first action and the second part of the first object performs the second action.

19. The non-transitory computer-readable storage medium according to claim 18, wherein the playing a target picture in the client comprises:
- playing at least one first animation frame and at least one second animation frame in the client, the target picture comprising the at least one first animation frame and the at least one second animation frame, the at least one first animation frame being used for indicating that the first object performs the first action, and the at least one second animation frame being used for indicating that the second part of the first object performs the second action; or
- playing at least one third animation frame in the client, the target picture comprising the at least one third animation frame, and the at least one third animation frame being used for indicating that the first object synchronously performs the first action and the second action.

* * * * *